(12) United States Patent
McDaniel et al.

(10) Patent No.: US 7,041,753 B2
(45) Date of Patent: May 9, 2006

(54) ORGANOMETAL CATALYST COMPOSITIONS

(75) Inventors: Max P. McDaniel, Bartlesville, OK (US); Joseph S. Shveima, Bartlesville, OK (US); James L. Smith, Bartlesville, OK (US); Kathy S. Collins, Bartlesville, OK (US); Elizabeth A. Benham, Bartlesville, OK (US); Anthony P. Eaton, Dewey, OK (US); Michael D. Jensen, Bartlesville, OK (US); Joel L. Martin, Bartlesville, OK (US); Gil R. Hawley, Dewey, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 10/683,449

(22) Filed: Oct. 10, 2003

(65) Prior Publication Data

US 2004/0180780 A1 Sep. 16, 2004

Related U.S. Application Data

(62) Division of application No. 09/564,293, filed on May 3, 2000, now Pat. No. 6,632,894.

(60) Provisional application No. 60/174,045, filed on Dec. 30, 1999.

(51) Int. Cl.
*C08F 2/06* (2006.01)
*C08F 4/76* (2006.01)

(52) U.S. Cl. .......... 526/89; 526/160; 526/348; 526/943; 502/118; 502/152

(58) Field of Classification Search ............ 502/81, 502/118, 119, 120, 132, 133, 167, 152; 526/89, 526/160, 348, 943
See application file for complete search history.

(56) References Cited

U.S. PATENT DOCUMENTS

| | | | |
|---|---|---|---|
| 5,308,811 | A | 5/1994 | Suga et al. |
| 5,330,734 | A | 7/1994 | Johnson et al. |
| 5,399,636 | A | 3/1995 | Alt et al. |
| 5,583,082 | A | 12/1996 | Pinnavaia et al. |
| 5,616,752 | A | 4/1997 | Patsidis et al. |
| 5,753,577 | A | 5/1998 | Hamura et al. |
| 5,807,800 | A | 9/1998 | Shamshoun et al. |
| 5,958,819 | A | 9/1999 | Johnson et al. |
| 6,153,716 | A | 11/2000 | Welch et al. |
| 6,399,535 | B1 * | 6/2002 | Shih et al. ............ 502/167 |

* cited by examiner

*Primary Examiner*—Robert D. Harlan
(74) *Attorney, Agent, or Firm*—Womble Carlyle Sandridge & Rice, PLLC

(57) ABSTRACT

This invention provides oxide matrix compositions that can be utilized in catalyst compositions that are useful for polymerizing at least one monomer to produce a polymer. The oxide matrix composition comprises residual mineral components and an oxide precursor. The catalyst composition comprises contacting an organometal compound, an organoaluminum compound, and an oxide matrix composition. Processes for producing the oxide matrix composition and the catalyst composition are also provided.

19 Claims, 1 Drawing Sheet

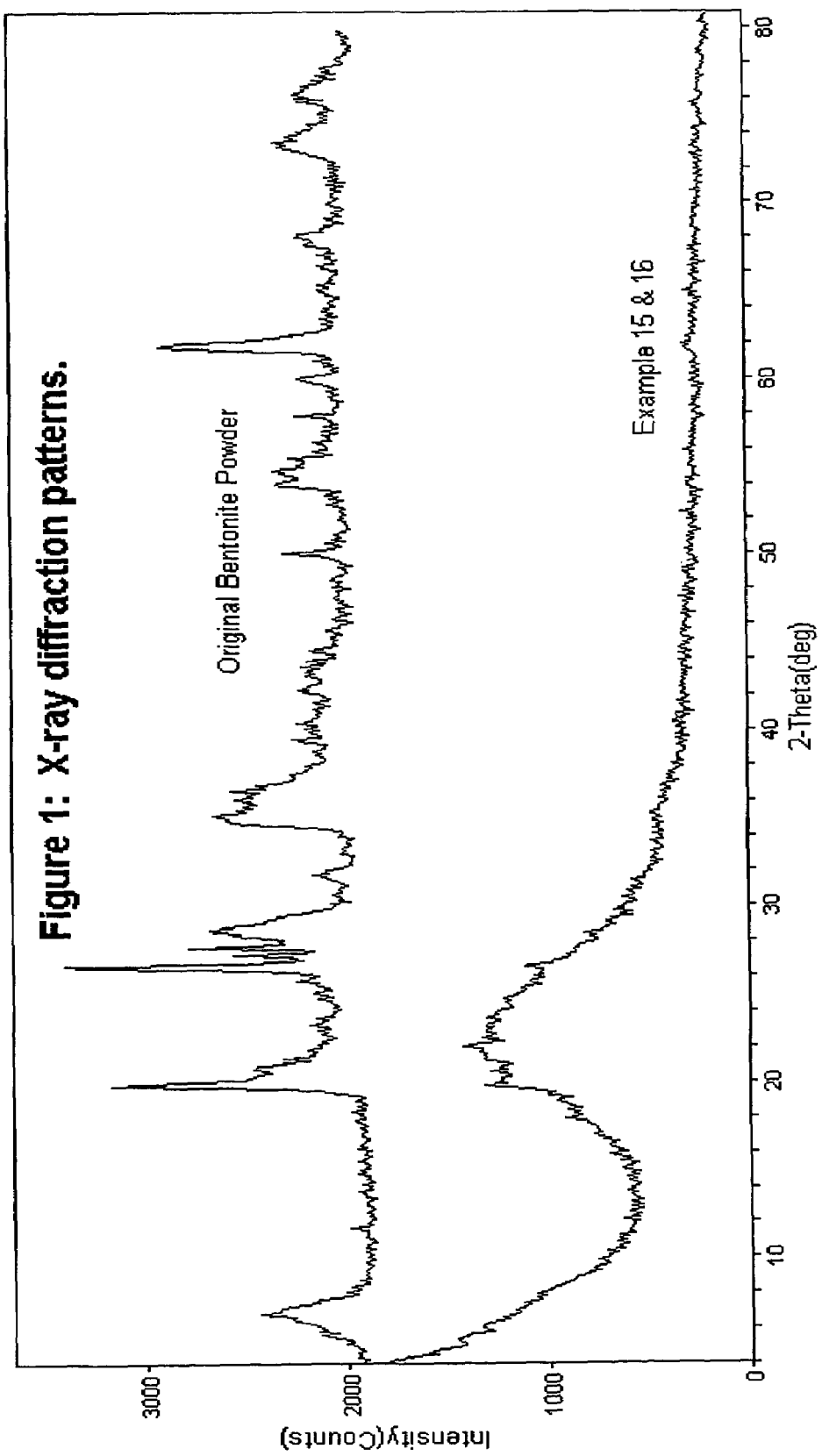

ial application of U.S. patent application Ser. No. 09/564,293 filed May 3, 2000 now U.S. Pat. No. 6,632,894. Application Ser. No. 09/564,293 claims the benefit of U.S. Provisional Application No. 60/174,045 filed Dec. 30, 1999. U.S. patent application Ser. No. 09/564, 293 and U.S. Provisional Application No. 60/174,045 are expressly incorporated herein in their entirety by reference.

ORGANOMETAL CATALYST COMPOSITIONS

This application is a divisional application of U.S. patent application Ser. No. 09/564,293 filed May 3, 2000 now U.S. Pat. No. 6,632,894. Application Ser. No. 09/564,293 claims the benefit of U.S. Provisional Application No. 60/174,045 filed Dec. 30, 1999. U.S. patent application Ser. No. 09/564, 293 and U.S. Provisional Application No. 60/174,045 are expressly incorporated herein in their entirety by reference.

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1974, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro-organo borate compounds have been use in place of large amounts of methyl aluminoxane. However, this is not satisfactory, since such borate compounds are very sensitive to poisons and decomposition, and can also be very expensive.

Clays having a lamellar structure have also been used to activate metallocenes, however, activity has not been high in the absence of cation exchanging or pillaring agents. Pillaring occurs when cations between the layers are replaced by other cations, usually more bulky and sometimes organic cations, that are called pillars due to their role of propping open the microscopic sheets and thus slightly expanding the layered structure of the clay to slightly increase its porosity. Clay also tends to be fine and dusty making it difficult to handle commercially in polymerization processes.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniform particles are desirable because they improve the efficiency of polymer production and transportation. Efforts have been made to produce heterogeneous metallocene catalysts; however, these catalysts have not been entirely satisfactory.

An object of this invention is to provide a process for producing a new type of high porosity, amorphous, oxide matrix composition comprising residual elements of a layered mineral and an oxide compound precursor. This oxide matrix composition can be utilized as an activator for metallocenes.

Another object of this invention is to provide the novel oxide matrix composition.

Another object of this invention is to provide a process that produces a catalyst composition that can be used to polymerize at least one monomer to produce a polymer.

Another object of this invention is to provide the catalyst composition.

Yet another object of this invention is to provide a process comprising contacting at least one monomer and the catalyst composition under polymerization conditions to produce the polymer.

Still another object of this invention is to provide an article that comprises the polymer produced with the catalyst composition of this invention.

SUMMARY OF THE INVENTION

In accordance with an embodiment of this invention, a process is provided to produce an oxide matrix composition. The process comprises (or optionally, "consists essentially of," or "consists of"):

1) substantially decomposing or exfoliating at least one layered mineral to produce residual mineral components;
   wherein the layered mineral is a clay, clay mineral, or other ion exchanging compound having a layered crystal structure;
2) contacting the residual mineral components and at least one oxide compound precursor to produce a first mixture;
   wherein the oxide compound precursor is selected from the group consisting of a silica source, alumina source, aluminosilicate source, aluminophosphate source, or combinations thereof.
3) subjecting the first mixture to such conditions to form a gel or precipitate; and
4) calcining the gel or precipitate at a temperature in the range of about 150° C. to about 800° C. to produce the oxide matrix composition.

In accordance with another embodiment of this invention, the oxide matrix composition is provided. The novel matrix oxide composition constitutes a previously unknown type of oxide matrix composition comprising residual mineral components and an oxide precursor compound. The oxide matrix composition has a high porosity and an amorphous structure, which is unlike that of previously known oxides and minerals.

In accordance with another embodiment of this invention, a process to produce a catalyst composition is provided. The process comprises contacting an organometal compound, an organoaluminum compound, and an oxide matrix composition to produce the catalyst composition, wherein the organometal compound has the following general formula:

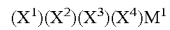

$(X^1)(X^2)(X^3)(X^4)M^1$ wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein ($X^2$) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on ($X^2$) are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen; p wherein at least one substituent on ($X^2$) can be a bridging group which connects ($X^1$) and ($X^2$);

wherein the organoaluminum compound has the following general formula:

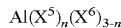

$$Al(X^5)_n(X^6)_{3-n}$$

wherein ($X^5$) is a hydrocarbyl having from 1 to about 20 carbon atoms;

wherein ($X^6$) is a halide, hydride, or alkoxide; and wherein "n" is a number from 1 to 3 inclusive.

In accordance with still another embodiment of this invention, a process is provided comprising contacting at least one monomer and the catalyst composition under polymerization conditions to produce a polymer.

In accordance with yet another embodiment of this invention, an article is provided. The article comprises the polymer produced in accordance with this invention.

These objects, and other objects, will become more apparent to those with ordinary skill in the art after reading this disclosure.

BRIEF DESCRIPTION OF THE FIGURE

FIG. 1 shows the X-ray diffraction pattern of the inventive oxide matrix composition and a bentonite control.

DETAILED DESCRIPTION OF THE INVENTION

In a first embodiment of this invention, a process is provided to produce an oxide matrix composition. The process comprises: 1) substantially exfoliating or decomposing at least one layered mineral to produce residual mineral components; 2) contacting the residual mineral components and at least one oxide precursor compound to produce a first mixture; 3) subjecting the first mixture to such conditions to form a gel or precipitate; and 4) drying and calcining the gel or precipitate at a temperature in the range of about 150° C. to about 800° C. to produce the oxide matrix composition.

The layered mineral is selected from the group consisting of clay, clay minerals, ion exchanging layered compounds, diatomaceous earth, silicates, and zeolites. These layered minerals can be natural or synthesized products. Clays are composed of fine crystals or particles of clay minerals with or without other rock or mineral particles. These fine crystals or particles of clay minerals have a diameter of about 3.9 micrometers or less and are arranged in layers or sheets. Generally, clays contain more than one clay mineral, and the clay minerals differ in chemical and physical properties. Clay minerals are usually the main constituent in the clay. Clay minerals are hydrous silicates of aluminum, magnesium, iron, and other less abundant elements. More specifically, a clay mineral is an inorganic polymeric compound comprising a tetrahedral unit and an octahedral unit. The tetrahedral unit usually comprises a central silica ion that coordinates to oxygen ions. The tetrahedral unit can also be aluminum and other ions that coordinate to oxygen ions. The octahedral unit comprises a central aluminum, magnesium, or iron ion that coordinates oxygen or hydroxide ions.

Specific examples of clay, clay minerals, and ion exchanging layered compounds include, but are not limited to, kaolin, bentonite, kibushi clay, gairome clay, allophane, hisingerite, pyrophyllite, talc, a mica group, a montmorillonite group, vermiculite, a chlorite group, palygorskite, kaolinite, nacrite, dickite, halloysite, layered silicates, and mixtures thereof.

Specific examples of layered silicates include, but are not limited to, lithium silicate, sodium silicate, potassium silicate, magnesium silicate, calcium silicate, barium silicate, aluminum silicate, titanium silicate, zirconium silicate, an olivaine group such as olivaine and fayalite, a garnet group such as garnet, a phenacite groups such as phenacite and willemite, zircon, tricalcium silicate, merrillite, gehlenite, benitoite, beryl, cordierite, a pyroxene group such as enstatite, hypersthene, diopside, spondumene, rhodonite, and wollastonite, an amphibole group such as anthophyllite, tremolite and actinolite, a feldspar group such as orthoclase, albite, barium feldspar and anorthite, a sodalite group such as sodalite and nocerite, analcite, and natrolite.

The layered mineral is substantially decomposed or exfoliated to its residual mineral components by any means known in the art. The decomposing or exfoliating of the layered mineral can be accomplished by contacting the layered mineral with a digestion agent selected from the group consisting of an aqueous solvent or other protic solvent followed by high shear mixing, high energy sonnification, grinding or milling to produce a colloidal suspension of residual mineral components. Preferably, the layered mineral is decomposed in a dilute aqueous or alcoholic solution by heating the solution in an acidic or basic medium at a temperature in the range of about 40° C. to about 100° C. for a period of about 1 minute to about a day. Typically, the pH of the acidic medium is less than about 3, and the pH of the basic medium is greater than about 10. Preferably, the heating under acidic or basic conditions is conducted for about 10 minutes to about 8 hours, and most preferably, 30 minutes to 6 hours.

The decomposition is complete when the layered mineral no longer has its original layered structure. The decomposition of the layered mineral can be detected by an increase in the viscosity of the colloidal suspension. If, after the oxide matrix composition is formed, the original sharp X-ray diffraction lines of the layered mineral have been replaced by a simple broad amorphous band, indicating loss of the original structure of the layered mineral, then the decomposition process was successful.

After decomposition of the original layered structure, the residual mineral components then are contacted with an oxide precursor compound to produce a first mixture. The oxide precursor compound is selected from the group consisting of a silica source, an alumina source, a phosphate source or combinations thereof. Any source of ungelled silicate solution can be used as an oxide precursor compound, including hydrocarbon or alcohol soluble organic silicates, such as, tetraethylorthosilicate, tetrabutylorthosilicate, or silicon tetrachloride, can be used. Ungelled silicate solutions are disclosed in U.S. Pat. Nos. 4,301,034; 4,547,557; and 4,339,559; the entire disclosures of which are herein incorporated by reference. An inorganic water soluble silicate, such as, for example, sodium silicate, water glass, and potassium silicate, can also be utilized as an oxide precursor compound in this invention. Inorganic water soluble silicates are disclosed in U.S. Pat. Nos. 3,900,457; 2,825,721; 3,225,023; 3,226,205; 3,622,521; and 3,625,864; the entire disclosures of which are hereby incorporated by reference. Aluminum salts, such as, for example, aluminum nitrate, aluminum chloride, aluminum acetate, aluminum sulfate, and mixtures thereof can be used as an alumina source. Organic aluminum compounds can also be utilized as an alumina source in this invention. Examples of organic aluminum compounds include, but are not limited to aluminum isopropoxide, aluminum acetylacetonate, and mixtures thereof. Organic aluminum compounds are disclosed in U.S. Pat. Nos. 4,364,842; 4,444,965; 4,364,855; 4,504,638; 4,364,854; 4,444,964; and 4,444,962; the entire disclosures of which are herein incorporated by reference. Anhydrous aluminum chloride can also be used as an oxide compound if dissolved in an aprotic solvent. Combinations of aluminum and silica sources also can be used. Other oxide compounds also can be present in the silica sources, alumina sources, and silica-alumina sources, such as, titania, zirconia, boria, magnesia, iron oxide, chromium oxide, or aluminophosphates. Preferably, the majority of the oxide precursor compound comprises silica.

The first mixture then is subjected to such conditions to form a gel or precipitate. Any gellation or precipitation method known in the art can be utilized. Preferably, the first mixture is gelled by adjusting the pH to within a range of about 4 to about 9. This gellation can be suddenly, as when aluminum hydroxide is precipitated by adding base to an acidic solution of aluminum ions, or it can take hours, as when a silica sol is allowed to set up and gel gradually. Gellation can occur when the first mixture is acidic or basic. For example, sodium silicate can be added to a nitric acid solution containing the residual mineral components. This method is disclosed in U.S. Pat. Nos. 3,887,494 and 3,1119,569; the entire disclosures of which are hereby incorporated by reference. Another method is to add sulfuric acid to a sodium aluminate solution containing the residual mineral components to produce a gel.

Optionally, the gel is aged for a specified period of time. Aging of the gel is preferred in order to impart strength to the gel. To age the gel, it is allowed to stand at a temperature in the range of about 60 to about 100° C. for about 5 minutes to about 10 hours, preferably from 1 hour to 5 hours. Preferably, the aging step is conducted in the presence of at least some water at a pH of greater than about 8 and most preferably, at a pH greater than about 9. Processes for aging a gel are disclosed in U.S. Pat. Nos. 4,405,501; 4,436,882; and 4,981,831; the entire disclosures of which are hereby incorporated by reference.

Optionally, the gel or precipitate is washed with an aqueous solution. Washing is preferred in order to remove salts formed from the gellation step. Washing can also sometimes be desirable if the gel is washed in an acidic aqueous solution to remove some cations contained in the original layered mineral, making it more acidic. After aging, the gel is washed in water sufficiently to remove unwanted ions, such as residual sodium or sulfate ions. Optionally, the gel then can be washed with an alcohol or other organic liquid of low surface tension, or it can be azeotroped in such a liquid, or extracted with such liquids to retain high porosity. Other pore preserving methods can also be used such as adding a surfactant. One method of conveniently washing the gel is to dry it first, then wash it in an acid aqueous solution followed by a second drying.

The gel or precipitate then is dried. Any means of drying the gel known in the art may be used, including spray drying, tray drying, flash drying, rotary kiln drying, and the like. Preferably, the water in the gel is replaced with an organic liquid of lower surface tension before being dried. If the gel has not been treated with an organic liquid to relieve surface tension, spray drying or flash drying is preferred.

Optionally, the gel is ground to a desirable particle size. Grinding through at least a 35 mesh screen is preferred. Most preferably, a 60 mesh screen is utilized. The oxide matrix composition thus obtained can have a granular controlled particle size, and not the fine dusty consistency of the layered mineral.

The gel or precipitate must be calcined to produce the oxide matrix composition. The calcining can be completed in a dry inert atmosphere. Alternatively, the calcining can be completed in an oxidizing atmosphere, such as, oxygen or air, or a reducing atmosphere, such as, hydrogen or carbon monoxide. The calcining treatment can also be conducted in stages, as for example, the calcining treatment can be conducted first in an oxidizing atmosphere, then in a reducing atmosphere at a different temperature, or vice-versa. Preferably, the calcining is completed in dry air or nitrogen at a temperature in a range of from about 150° C. to about 800° C., most preferably, from 200° C. to 500° C. Generally, this calcining is conducted for a time in the range of about 1 minute to about 100 hours, preferably for a time in the range of 3 to 20 hours. Methods of calcining are disclosed in U.S. Pat. Nos. 4,151,122; 4,177,162; 4,247,421; 4,248,735; 4,297,460; 4,397,769; and 4,460,756; the entire disclosures of which are hereby incorporated by reference.

Generally, the oxide matrix composition comprises about 1 to about 70% by weight residual mineral components. Preferably, the oxide matrix composition comprises about 2 to about 50% by weight residual mineral components, and most preferably, 10 to 30% by weight.

The oxide matrix composition provided by this invention has an amorphous structure. The decomposing or exfoliating step substantially breaks down the original layered structure of the mineral. This change can be detected by the X-ray diffraction pattern taken of the oxide matrix composition. The sharp X-ray diffraction lines of the original crystalline layered mineral have been replaced by a simple, broad amorphous band, indicating loss of the original structure of the layered mineral.

Another point of distinction of these novel oxide matrix compositions is their high porosity. Whereas clay minerals usually exhibit very low pore volume, less than 0.3 mL/g, and even when pillared usually less than 0.5 mL/g, the oxide matrix composition of this invention has pore volumes greater than about 0.75 mL/g, preferably greater than about 1.0 mL/g, more preferably greater than about 1.3 mL/g, and most preferably greater than 1.6 mL/g. Generally, the oxide matrix has a surface area greater than 200 m$^2$/g, preferably greater than 400 m$^2$/g.

In accordance with another embodiment to produce the oxide matrix composition, a process is provided comprising: 1) substantially decomposing or exfoliating a layered mineral to produce residual mineral components in the presence of an oxide precursor compound to produce a residual mineral component/oxide precursor mixture; 2) subjecting said residual mineral/component mixture to such conditions to form a gel or precipitate; and 3) drying and calcining said gel or precipitate at a temperature in a range of about 150° C. to about 800° C. to produce said oxide matrix composition. Layered minerals, residual mineral components, oxide precursor compounds were previously discussed in this disclosure. In addition, methods of decomposing, gelling, drying, and calcining have also been previously discussed in this disclosure.

In accordance with a second embodiment of this invention, the oxide matrix composition is provided. The oxide matrix composition comprises the residual mineral components and the oxide compound. Residual mineral components and the oxide compound were previously discussed in this disclosure.

In accordance with a third embodiment of this invention, a process to produce a catalyst composition is provided. The process comprises contacting an organometal compound, an organoaluminum compound, and an oxide matrix composition to produce the catalyst composition.

Organometal compounds used in this invention have the following general formula:

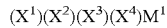

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

bis(cyclopentadienyl)hafnium dichloride;

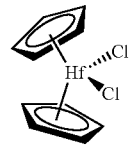

bis(cyclopentadienyl)zirconium dichloride;

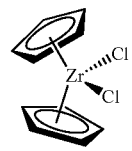

1,2-ethanediylbis($p^5$-1-indenyl)di-n-butoxyhafnium;

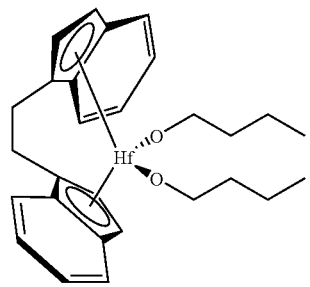

1,2-ethanediylbis(75-1-indenyl)dimethylzirconium;
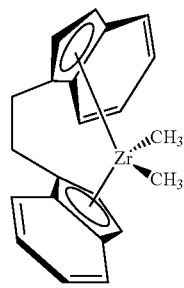
3,3-pentanediylbis(η$^5$-4,5,6,7-tetrahydro-1-indenyl) hafnium dichloride;
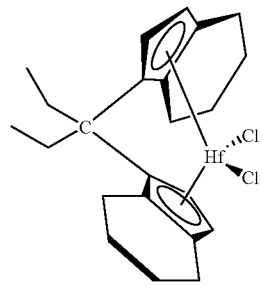
methylphenylsilylbis(η$^5$-4,5,6,7-tetrahydro-1-indenyl) zirconium dichloride;
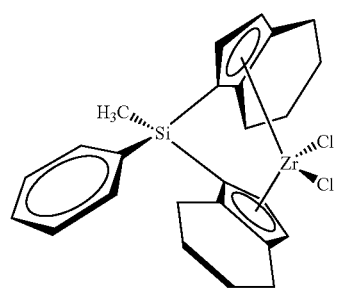
bis(n-butylcyclopentadienyl)bis(di-t-butylamido) hafnium;
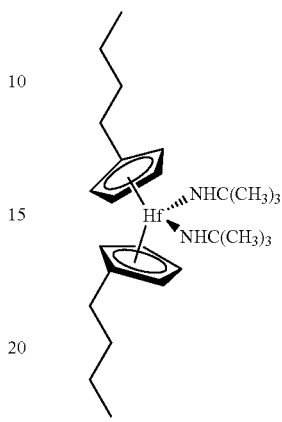
bis(n-butylcyclopentadienyl)zirconium dichloride;
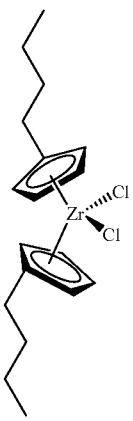
dimethylsilylbis(1-indenyl)zirconium dichloride;
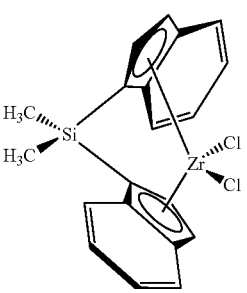

octylphenylsilylbis(1-indenyl)hafnium dichloride;

1,2-ethanediylbis(9-fluorenyl)zirconium dichloride;

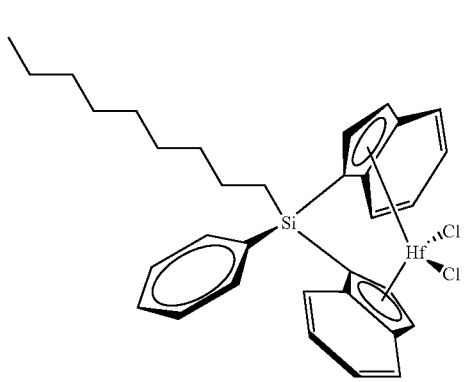

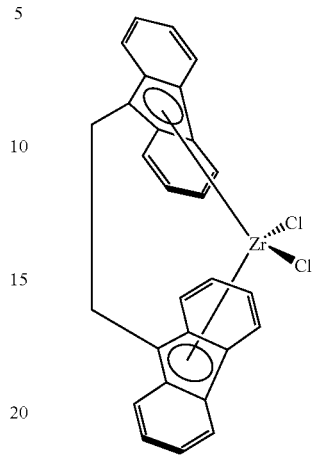

dimethylsilylbis($\eta^5$-4,5,6,7-tetrahydro-1-indenyl)zirconium dichloride;

indenyl diethoxy titanium(IV) chloride;

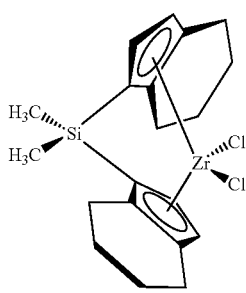

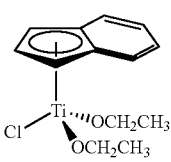

(isopropylamidodimethylsilyl)cyclopentadienyltitanium dichloride;

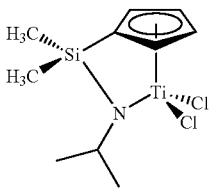

dimethylsilylbis(2-methyl-1-indenyl)zirconium dichloride;

bis(pentamethylcyclopentadienyl)zirconium dichloride;

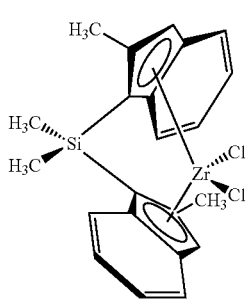

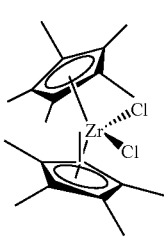

bis(indenyl)zirconium dichloride;

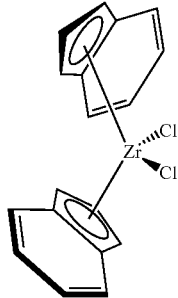

methyloctylsilyl bis(9-fluorenyl)zirconium dichloride;

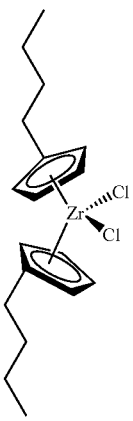

and
bis-[1-(N,N-diisopropylamino)boratabenzene]hydridozirconium trifluoromethylsulfonate

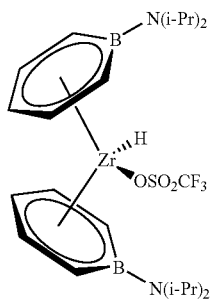

Preferably, the organometal compound is selected from the group consisting of
bis(n-butylcyclopentadienyl)zirconium dichloride;

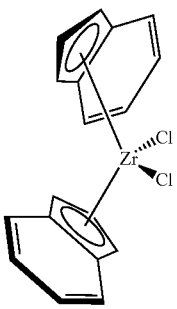

bis(indenyl)zirconium dichloride;

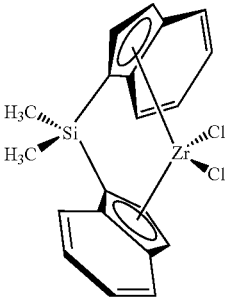

dimethylsilylbis(1-indenyl)zirconium dichloride;

and
methyloctylsilylbis(9-fluorenyl)zirconium dichloride

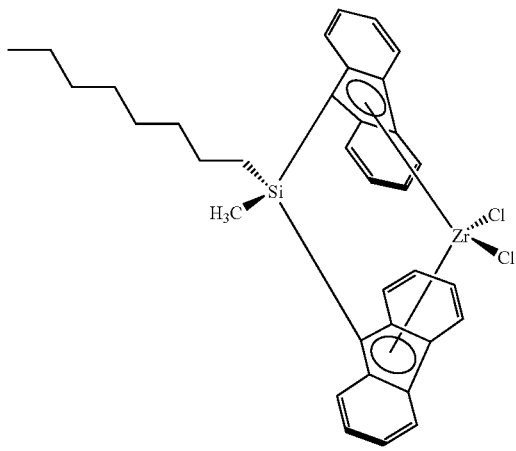

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:
trimethylaluminum;
triethylaluminum (TEA);
tripropylaluminum;
diethylaluminum ethoxide;
tributylaluminum;
diisobutylaluminum hydride;
triisobutylaluminum hydride;
triisobutylaluminum; and
diethylaluminum chloride.

Currently, TEA is preferred.

The process of producing the oxide matrix composition was previously discussed in this disclosure.

The catalyst compositions of this invention can be produced by contacting the organometal compound, the organoaluminum compound, and the oxide matrix composition, together. This contacting can occur in a variety of ways, such as, for example, blending. Furthermore, each of these compounds can be fed into a reactor separately, or various combinations of these compounds can be contacted together before being further contacted in the reactor, or all three compounds can be contacted together before being introduced into the reactor.

Currently, one method is to first contact the organometal compound and the oxide matrix composition together, for about 1 minute to about 24 hours, preferably, 1 minute to 1 hour, at a temperature from about 10° C. to about 200° C., preferably 15° C. to 80° C., to form a first mixture, and then contact this first mixture with an organoaluminum compound to form the catalyst composition.

Another method is to precontact the organometal compound, the organoaluminum compound, and the oxide matrix composition before injection into a polymerization reactor for about 1 minute to about 24 hours, preferably, 1 minute to 1 hour, at a temperature from about 10° C. to about 200° C., preferably 20° C. to 80° C.

A weight ratio of the organoaluminum compound to the oxide matrix composition in the catalyst composition ranges from about 5:1 to about 1:1000, preferably, from about 3:1 to about 1:100, and most preferably, from 1:1 to 1:50.

A weight ratio of the oxide matrix composition to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted oxide matrix composition. Preferably, the post-contacted oxide matrix composition is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted oxide matrix composition in the catalyst composition ranges from about 5:1 to about 1:1000, preferably, from about 3:1 to about 1:100, and most preferably, from 1:1 to 1:50.

A weight ratio of the post-contacted oxide matrix composition to the post-contacted organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

The catalyst composition of this invention has an activity greater than 1000 grams of polymer per gram of oxide matrix composition per hour, preferably greater than 2000, and most preferably greater than about 3,000. This activity is measured under slurry polymerization conditions, using isobutane as the diluent, and with a polymerization temperature of 90° C., and an ethylene pressure of 450 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no fluoro-organo borate compounds need to be used in order to form the catalyst composition. The oxide matrix composition of this invention is inorganic when the oxide matrix is formed, heterogenous in a organic polymerization medium, and can be can be easily and inexpensively produced because of the substantial absence of any aluminoxane compounds or fluoro-organo borate compounds. Layered minerals are not required in the catalyst composition. It should be noted that organochromium compounds and $MgCl_2$ are not needed in order to form the catalyst composition. Although aluminoxane, fluoro-organo borate compounds, layered minerals, organochromium compounds, and $MgCl_2$ are not needed in the preferred embodiments, these compounds can be used in other embodiments of this invention.

In another embodiment of this invention, a process comprising contacting at least one monomer and the catalyst composition to produce a polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the oxide matrix composition is in the range of about 10 to about 1000 microns, preferably about 25 to about 500 microns, and most preferably, 50 to 200 microns, for best control during polymerization.

Hydrogen can be used with this invention in a polymerization process to control polymer molecular weight.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Testing Methods

A "Quantachrome Autosorb-6 Nitrogen Pore Size Distribution Instrument" was used to determined surface area and pore volume. This instrument was acquired from the Quantachrome Corporation, Syosset, N.Y.

Calcining Treatment

To calcine a specified material in these examples, about 10 grams were placed in a 1.75 inch quartz tube fitted with a sintered quartz disk at the bottom. While the specified material was supported on the disk, dry nitrogen was blown up through the disk at a rate of about 1.6 to about 1.8 standard cubic feet per hour. An electric furnace around the quartz tube was then turned on, and the temperature was raised at the rate of 400° C. per hour to the indicated temperature, which was 300° C. At that temperature, the specified material was allowed to fluidize for three hours in the dry air to produce a calcined material. Afterward, the calcined material was collected and stored under dry nitrogen, where it was protected from the atmosphere until ready for testing. It was never allowed to experience any exposure to the atmosphere.

Polymerization Test Procedure

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree Celsius, with the help of electronic control instruments.

Unless otherwise stated, a small amount (0.01 to 0.10 gram normally) of a layered mineral, layered mineral mixture, or inventive oxide matrix composition was first charged under nitrogen to a dry reactor. Next, 2.0 milliliters of a toluene solution containing 0.5 percent by weight of bis(n-butylcyclopentadienyl) zirconium dichloride were added to the reactor, followed by 0.6 liter of isobutane liquid. Then, 1.0 milliliter of a 1.0 molar solution of triethyl aluminum (TEA) was added, followed by another 0.6 liter of isobutane liquid. Then, the reactor was heated up to a specified temperature, typically 90° C., and finally ethylene was added to the reactor to equal a fixed pressure, generally 450 psig unless otherwise stated, to produce a reaction mixture. The reaction mixture was allowed to stir for usually about one hour. As ethylene was consumed, more ethylene flowed in to maintain the pressure. The activity was noted by recording the flow of ethylene into the reactor to maintain the set pressure.

After the allotted time, the ethylene flow was stopped, and the reactor slowly depressurized and opened to recover a granular polymer. In all cases, the reactor was clean with no indication of any wall scale, coating or other forms of fouling. The polymer was then removed and weighed. Activity was specified as grams of polymer produced per gram of the bentonite utilized or contained in a layered mineral mixture or inventive oxide matrix composition per hour of reaction time.

Control Example 1

A fine Volclay bentonite was calcined in nitrogen for 3 hours to produce a calcined bentonite. The calcined bentonite was found by nitrogen sorption to have a pore volume of about 0.17 milliliter per gram and a surface area of about 34 square meters per gram. The calcined bentonite was tested for polymerization activity according to the procedure described previously. It exhibited an activity of about 9590 grams of polymer per gram of calcined bentonite per hour. The polymer was very fine.

Inventive Example 2

50 grams of the bentonite used in Example 2 were added to 1 liter of water and allowed to stir for 2 hours at 70° C. to produce a first mixture. In another beaker, 200 milliliters of tetraethoxysilane (Si(OEt)$_4$) containing 120 grams of silica were added to 500 milliliters of isopropanol along with 0.6 gram of sulfuric acid and 32.4 milliliters of water to produce a second mixture. There was not quite enough water to hydrolyze the silica. The second mixture was stirred for 4 hours. Then, the first mixture was added to the second mixture to produce a third mixture. The third mixture became hot, indicating reaction of the tetraethoxysilane. The third mixture was allowed to stir for about two more hours at which time it gelled spontaneously. Half of this gel was then dried in an oven under vacuum at 110° C. overnight. It then was ground through a 100 mesh screen and calcined at 300° C. to produce an oxide matrix composition. The oxide matrix composition was tested as an activator for an organometal compound per the polymerization procedure discussed previously. It yielded an activity of 11,687 grams of polymer per gram of bentonite used per hour, which is higher than Control Example 1.

Inventive Example 3

The other half of the gel made in Example 2 (before drying, grinding, and calcining) was then aged by placing it in two liters of n-propanol along with 30 milliliters of concentrated ammonium hydroxide (28% by weight NH$_3$). This mixture was heated to 80° C. where it was allowed to stir for 20 minutes. The gel was then filtered out and dried in the vacuum oven overnight at 110° C. to produce an aged gel. The aged gel then was calcined at 300° C. to produce an oxide matrix composition. The oxide matrix composition was not ground through a screen. It was tested for polymerization activity and found to yield 19,722 grams of polymer per gram of bentonite used per hour.

Inventive Example 4

A sample of the aged gel from example 3 before calcining was ground through a 100 mesh screen and calcined at 300° C. to produce an oxide matrix composition. The oxide matrix composition was found to have a pore volume of about 2.65 milliliter per gram and a surface area of about 468 square meters per gram. When tested for polymerization activity according to the procedures described previously, it yielded an activity of 51,200 grams of polymer per gram of bentonite used per hour.

Control Example 5

Another, but unsuccessful, method of adding silica is illustrated by this example. 25 grams of Cabosil HS-5, an extremely fine silica formed by flame hydrolysis, were added to 1 liter of water which was heated to 70° C. Then, 50 grams of bentonite were added to produce a silica/bentonite mixture. The silica/bentonite mixture was stirred for two hours, and then centrifuged to isolate the solids. The solids were added to two liters of n-propanol, which was heated to 60° C. and stirred for 20 minutes. The solids were removed again by centrifugation then dried under vacuum at 110° C. After drying, the solids were ground through a 100 mesh screen and calcined at 300° C. in nitrogen to produce a calcined silica/bentonite mixture. Upon testing for polymerization activity, it was found to yield 853 grams of polymer per gram of bentonite used per hour.

Control Example 6

The following example demonstrates that the benefit shown in Inventive Examples 2–4 is not simply a consequence of the aging step or alcohol wash step on the bentonite, nor can the bentonite be enhanced by simply decomposing and reconstituting it. 50 grams of bentonite were slurried in one liter of water to which 25 milliliters of concentrated ammonium hydroxide were added to produce a first mixture. The first mixture was heated to 80° C. and held at this temperature while stirring for an hour. Then, it was centrifuged to remove solids. The solids then were slurried again in two liters of n-propanol to produce a second mixture. The second mixture was heated to 60° C. and stirred for 20 minutes. Then, the second mixture was centrifuged again to remove the solids, and the solids were placed in a vacuum oven at 110° C. overnight to produce a decomposed, aged and reconstituted bentonite. The decomposed, aged, and reconstituted bentonite then was ground through a 100 mesh sieve and calcined at 300° C. in nitrogen for three hours. This material was still found to exhibit an X-ray diffraction pattern, indicating a layered structure. Upon testing for polymerization according to the procedure discussed previously, an activity of 2434 grams of polymer per gram of decomposed, aged and reconstituted bentonite per hour was observed.

Inventive Example 7

The following example demonstrates gellation of residual bentonite components in an alumina matrix. Ten grams of Catapal alumina (lot V2403A) were slurried in 200 milliliters of water. Then, one milliliter of nitric acid was added, and the Catapal alumina dissolved (peptized) into a clear colloidal suspension to produce an acidic mixture. Then, 20 grams of bentonite were added to the acidic mixture. The acidic mixture was stirred and digested at 70° C. for two hours. Finally, 5 milliliters of concentrated ammonium hydroxide were added to neutralize the acidity to produce a gel. The gel was then vacuum dried at 110° C. overnight and ground through a 100 mesh screen. A sample was calcined in nitrogen at 300° C. to produce an oxide matrix composition. The oxide matrix composition was tested for polymerization activity. It yielded 6645 grams of polymer per gram of bentonite used per hour.

Inventive Example 8

25 grams of Catapal alumina were added to one liter of water. Then, one milliliter of nitric acid was added to produce an acidic mixture, and the acidic mixture heated to 70° C. The alumina dissolved (peptized) into a clear colloidal suspension. Then, 50 grams of bentonite were added to the acidic mixture to produce a second mixture. The second mixture was held for 2 hours at 70° C. Then, 5 milliliters of concentrated ammonium hydroxide were added to neutralize the second mixture to produce a gel. Half of the gel then was freeze dried for four days. The freeze-dried gel was ground through a 35 mesh screen and calcined in nitrogen at 300°

C. to produce an oxide matrix composition. The oxide matrix composition was tested for polymerization activity. It yielded 9797 grams of polymer per gram of bentonite used per hour.

Inventive Example 9

The other half of the gel from example 8 was then added to 2 liters of n-propanol and stirred at 70° C. for half an hour to produce a first mixture. Then, the first mixture was centrifuged to remove solids, and the solid were vacuum dried overnight at 110° C. The solids were then ground through a 50 mesh screen and calcined in nitrogen at 300° C. to produce an oxide matrix composition. The new oxide matrix composition was tested for polymerization activity. It yielded 12,380 grams of polymer per gram of bentonite used per hour.

Inventive Example 10

1.0 gram of bentonite was added to 100 milliliters of water and sonnicated for 45 minutes to produce a first mixture. Sonnification was conducted using a Sonics Materials 500 watt Vibracell Sonicator, model VC500, available from Sonics Materials, Danbury, Conn. It was set at 40% pulsed mode with a microtip limit of 7, using a Sonics Materials model V14 horn. The first mixture became very viscous. Then, 146.36 grams of aluminum nitrate nonahydrate were added to produce a second mixture. The second mixture was stirred and heated to 70° C. for 15 minutes. 90 milliliters of concentrated (28%) ammonia solution were added to the second mixture to produce a gel. The gel was diluted with 1 liter of water and further ammonia was added to adjust the pH to 10.5 to produce a third mixture. The temperature was raised to 80° C., and the third mixture was stirred at this temperature and pH for one hour. The third mixture was then filtered, and the filtrate was washed in 1 liter of isopropanol. After filtration, the filtrate was dried overnight at 110° C. under half an atmosphere of vacuum, then ground through a 35 mesh screen and calcined in nitrogen for three hours at 300° C. to produce an oxide matrix composition. The oxide matrix composition was tested in a polymerization run according to the procedure discussed previously except 550 psig of pressure was applied to the reactor. Only a small activity was observed.

Inventive Example 11

5.12 grams of bentonite were slurried in 100 milliliters of water to produce a first mixture. The first mixture was sonnicated for 65 minutes. The first mixture became very viscous. Then, 146.35 grams of aluminum nitrate nonahydrate were added together with 800 milliliters of water to the first mixture to produce a second mixture. The second mixture was stirred and heated to 70° C. for 15 minutes. 90 milliliters of concentrated (28%) ammonia solution were added to the second mixture to produce a gel. The gel was diluted with 1 liter of water and further ammonia added to adjust the pH to 10.0 to produce a third mixture. The temperature was raised to 80° C., and the third mixture was stirred at that temperature and pH for one hour. The third mixture was then filtered, and the filtrate was washed in 4 liters of n-propanol at 60° C. After filtration, the gel was dried overnight at 110° C. under half an atmosphere of vacuum to produce a dried powder. The dry powder was ground through a 35 mesh screen and calcined in nitrogen for three hours at 300° C. to produce an oxide matrix composition. The oxide matrix composition was tested in a polymerization run according to the procedure discussed previously except 550 psig of pressure was applied to the reactor. Only a small activity was observed.

Inventive Examples 12 & 13

1.0 gram of bentonite was slurried in 100 milliliters of water to which 3 milliliters of concentrated nitric acid were added to produce a first mixture. The first mixture was sonnicated for 65 minutes and became very viscous. Then, 19.43 grams of aluminum nitrate nonahydrate were added to produce a second mixture. The second mixture was stirred and heated to 60° C. for 20 minutes. 35 milliliters of concentrated (28%) ammonia solution were added to the second mixture to cause gellation. The gel was diluted with 1 liter of water and further ammonia was added to adjust the pH to 10.3 to produce a third mixture. The temperature was raised to 60° C., and the third mixture stirred at that temperature and pH for one hour. It was then diluted with one liter of water and stirred at 60° C. After filtration, the third mixture was washed twice in 1 liter of n-propanol and finally dried overnight at 110° C. under half an atmosphere of vacuum to produce a dry powder. The dry powder was ground through a 35 mesh screen and calcined in nitrogen for three hours at 300° C. to produce an oxide matrix composition. It then was tested for polymerization activity as described previously except that 550 psig pressure was applied to the reactor (Example 12). The new oxide matrix composition was also tested a second time in the reactor at the normal 450 psig pressure (Example 13). X-ray diffraction indicated only the broad peaks, which illustrated that the bentonite had been decomposed to its residual components forming a new structure.

Inventive Example 14

2.66 grams of bentonite were added to 100 milliliters of water and sonnicated for 1 hour to produce a first mixture. Then, 111 grams of sodium silicate solution (27% silica) were added to the first mixture along with 100 milliliters of water to produce a second mixture. The second mixture was heated to boiling for about 30 minutes. It was allowed to cool and sit overnight. Then, 20 milliliters of concentrated nitric acid were added to the second mixture to neutralize the sodium silicate and produced a gel. The gel was then washed four times in 4 liters of water containing 10 milliliters of galatial acetic acid to cause the wash pH to be slightly acid. The gel was then given a final wash in 4 liters of n-propanol and dried overnight. The gel was ground through a 35 mesh screen and calcined at 300° C. in nitrogen for three hours to produce an oxide matrix composition. The oxide matrix composition was tested in a polymerization run according to the procedure discussed previously except that 550 psig pressure was applied to the reactor. An activity of 20,213 grams of polymer per gram of bentonite used was observed.

Inventive Examples 15 & 16

1.0 gram of bentonite was sonnicated for 1 hour in 100 milliliters of water containing 2.0 milliliters of concentrated nitric acid to produce a first mixture. The first mixture became very viscous. The first mixture was added to a solution containing 300 milliliters of n-propanol and 33 milliliters of silicon tetraethoxide to produce a second mixture. The second mixture was stirred for one hour, and then, 10 milliliters of concentrated ammonia solution (28%) were added to neutralize the nitric acid and thus cause gellation. The gel then was aged when 100 milliliters n-propanol were added, and it was heated to 80° C. and stirred for one hour. The gel was washed in 1 liter of n-propanol and dried overnight. The gel then was ground through a 35 mesh screen and calcined in nitrogen at 300° C. for three hours to produce an oxide matrix composition. The oxide matrix composition was found to have a pore volume of about 2.46 milliliter per gram and a surface area of 635 square meters per gram. The oxide matrix composition was tested for polymerization activity as described previously except that 550 psig pressure was applied to the reactor (Example 15). In Example 15, an activity of 42,172 grams of polymer per gram of bentonite used per hour was observed. The oxide matrix composition also was tested a second time under the normal 450 psig pressure (Example 16). In Example 16, an activity of 18,604 grams of polymer per gram of bentonite used per hour was observed. X-ray diffraction indicated only broad peaks which indicates that the bentonite had been decomposed to its residual components. The X-ray diffraction pattern of the oxide matrix composition is shown in FIG. 1 along with the original bentonite control of Example 1.

Inventive Example 17

1.0 gram of bentonite was sonnicated for 1 hour in 100 milliliters of water containing 10 milliliters of ammonia solution (28% by weight) to produce a first mixture. The first mixture then was added to 300 milliliters of n-propanol containing 34 milliliters of silicon tetraethoxide to produce a second mixture. The second mixture was boiled for 30 minutes during which time a gel formed. An additional 50 milliliters of n-propanol then were added to the gel to form a third mixture. The gel was allowed to settle out from the third mixture. The supernatant liquid of the third mixture was poured off, and 500 milliliters of n-propanol were added again. This process was repeated five times before the gel was allowed finally to dry overnight. The gel was ground through a 35 mesh screen and calcined in nitrogen at 300° C. for three hours to produce an oxide matrix composition. The oxide matrix composition was found to have a pore volume of about 2.36 milliliters per gram and a surface area of about 388 square meters per gram. The oxide matrix composition then was tested for polymerization activity as described previously except that 550 psig pressure was applied to the reactor. An activity of 27,602 grams of polymer per gram of bentonite used per hour was observed.

TABLE 1

Summary of Examples

| Example | Test Material | Bentonite Conc.(a) | Aging | Last Wash | Drying | Wt Charged To Reactor | g Polymer Produced | Reaction Time, min | Activity g/g/h |
|---|---|---|---|---|---|---|---|---|---|
| 1-Control | Bentonite | 1.00 | no | None | none | 0.0078 | 74.8 | 60 | 9590 |
| 2-Inventive | Oxide Matrix (silica gel from Si(OEt)$_4$) | 0.25 | no | Alcohol | oven | 0.0243 | 71 | 60 | 11687 |
| 3-Inventive | Oxide Matrix (silica gel from Si(OEt)$_4$) | 0.25 | yes | Alcohol | oven | 0.0144 | 71 | 60 | 19722 |
| 4-Inventive | Oxide Matrix (silica gel from Si(OEt)$_4$) | 0.25 | yes | Alcohol | oven | 0.0025 | 32 | 60 | 51200 |
| 5-Control | Cabosil Silica/Bentonite Mixture | 0.67 | no | Alcohol | oven | 0.007 | 2 | 30 | 853 |
| 6-Control | Decomposed, Aged, Reconstituted Bentonite | 1.00 | yes | Alcohol | oven | 0.0843 | 171 | 50 | 2434 |
| 7-Inventive | Oxide Matrix (Catapal Alumina) | 0.67 | no | Water | oven | 0.0283 | 126 | 60 | 6645 |
| 8-Inventive | Oxide Matrix (Catapal Alumina) | 0.67 | no | water | freeze dry | 0.0227 | 149 | 60 | 9797 |
| 9-Inventive | Oxide Matrix (Catapal Alumina) | 0.67 | yes | alcohol | oven | 0.0217 | 180 | 60 | 12380 |
| 10-Inventive | Oxide Matrix (Alumina from Al(NO$_3$)$_3$) | 0.0476 | yes | alcohol | oven | 0.7416 | 3 | 60 | 85 |
| 11-Inventive | Oxide Matrix (Alumina from Al(NO$_3$)$_3$) | 0.204 | yes | alcohol | oven | 0.5020 | 0 | 60 | 0 |
| 12-Inventive | Oxide Matrix (Alumina from Al(NO$_3$)$_3$) | 0.275 | yes | alcohol | oven | 0.2240 | 179 | 30 | 5812 |
| 13-Inventive | Oxide Matrix (Alumina from Al(NO$_3$)$_3$) | 0.275 | yes | alcohol | oven | 0.1327 | 212 | 60 | 5781 |
| 14-Inventive | Oxide Matrix (silica from water glass) | 0.0814 | yes | alcohol | oven | 0.0936 | 77 | 30 | 20213 |
| 15-Inventive | Oxide Matrix (silica gel from Si(OEt)$_4$) | 0.095 | yes | alcohol | oven | 0.1238 | 248 | 30 | 42173 |
| 16-Inventive | Oxide Matrix (silica gel from Si(OEt)$_4$) | 0.095 | yes | alcohol | oven | 0.1572 | 213 | 46 | 18604 |
| 17-Inventive | Oxide Matrix (silica gel from Si(OEt)$_4$) | 0.0925 | yes | alcohol | Oven | 0.0376 | 96 | 60 | 27602 |

(a)This is the weight fraction of the total final oxide matrix composition that came from decomposed bentonite.

While this invention has been described in detail for the purpose of illustration, it is not intended to be limited thereby but is intended to cover all changes and modifications within the spirit and scope thereof.

The invention claimed is:

1. A process to produce an amorphous oxide matrix composition, said process comprising:
   1) substantially decomposing or exfoliating at least one layered mineral to produce residual mineral components;
   wherein said layered mineral is a clay, clay mineral, or ion exchanging compound having a layered crystal structure;
   2) contacting said residual mineral components and at least one oxide precursor compound to produce a first mixture;
   wherein said oxide precursor compound is a silica source, an alumina source, a phosphate source; or combinations thereof;
   3) subjecting said first mixture to such conditions to form a co-gel or co-precipitate; and
   4) drying said co-gel or co-precipitate and then calcining said co-gel or co-precipitate at a temperature in a range of about 150° C. to about 800° C. to produce said oxide matrix composition.

2. A process according to claim 1 wherein said decomposing or exfoliating is accomplished by contacting said layered mineral with a digestion agent which is an aqueous solvent or other protic solvent followed by a) high shear mixing, b) high energy sonnification, or c) grinding or milling to produce a colloidal suspension of said residual mineral components.

3. A process according to claim 1 wherein said co-gel is formed by adjusting the pH of said first mixture to a pH in a range of about 4 to about 9.

4. A process according to claim 1 further comprising aging said co-gel for about 5 minutes to about 10 hours at a temperature in a range of about 60 to 100° C. prior to drying and calcining to produce an aged gel or precipitate.

5. A process according to claim 4 further comprising washing said aged gel prior to drying and calcining to remove undesirable ions.

6. A process according to claim 5 further comprising grinding said aged gel to a desirable particle size prior to calcining.

7. A process to produce an amorphous oxide matrix composition, said process comprising:
 1) substantially decomposing or exfoliating a layered mineral to produce residual mineral components in the presence of an oxide precursor compound to produce a residual mineral component/oxide precursor mixture;
wherein said layered mineral is a clay, clay mineral, or ion exchanging compound having a layered crystal structure;
wherein said oxide precursor compound is a silica source, an alumina source, a phosphate source; or combinations thereof,
 2) subjecting said residual mineral/component mixture to such conditions to form a co-gel or co-precipitate; and
 3) drying said co-gel or co-precipitate and then calcining said co-gel or co-precipitate at a temperature in a range of about 150° C. to about 800° C. to produce said oxide matrix composition.

8. A process according to claim 7 wherein said decomposing or exfoliating is accomplished by contacting said layered mineral with a digestion agent which is an aqueous solvent or other protic solvent followed by a) high shear mixing, b) high energy sonnification, or c) grinding or milling to produce a colloidal suspension of said residual mineral components.

9. A process according to claim 8 wherein said co-gel is formed by adjusting the pH of said residual mineral component/oxide precursor mixture to a pH in a range of about 4 to about 9.

10. A process according to claim 7 further comprising aging said co-gel for about 5 minutes to about 10 hours at a temperature in a range of about 60 to 100° C. prior to drying and calcining to produce an aged gel or aged precipitate.

11. A process according to claim 10 further comprising washing said aged gel or precipitate prior to drying and calcining to remove undesirable ions.

12. A process according to claim 11 further comprising grinding said aged gel or precipitate to a desirable particle size prior to calcining.

13. An amorphous oxide matrix composition produced by claim 1.

14. An amorphous oxide matrix composition produced by claim 7.

15. An amorphous oxide matrix composition comprising a co-gel or co-precipitate comprising residual mineral components and at least one oxide precursor compound;
wherein said residual mineral components are produced by substantially decomposing or exfoliating a layered mineral to produce residual mineral components;
wherein said layered mineral is a clay, clay mineral, or ion exchanging compound having a layered crystal structure; and
wherein said oxide precursor compound is a silica source, alumina source, a phosphate source, or combinations thereof.

16. An oxide matrix composition made according to claim 1 having an amorphous X-ray diffraction pattern.

17. An oxide matrix composition made according to claim 7 having an amorphous X-ray diffraction pattern.

18. An oxide matrix composition made according to claim 1 having a pore volume greater than 1.0 mL/g.

19. An oxide matrix composition made according to claim 7 having a pore volume greater than 1.0 mL/g.

* * * * *

UNITED STATES PATENT AND TRADEMARK OFFICE
CERTIFICATE OF CORRECTION

PATENT NO.       : 7,041,753 B2
APPLICATION NO.  : 10/683449
DATED            : May 9, 2006
INVENTOR(S)      : Max McDaniel et al.

It is certified that error appears in the above-identified patent and that said Letters Patent is hereby corrected as shown below:

column 15, line 45 delete "triisobutylaluminum hydride"
column 16, line 54 change "heterogenous" to "heterogeneous"
column 22, line 43 change "galatial" to "glacial"

Signed and Sealed this

Fifth Day of September, 2006

JON W. DUDAS
*Director of the United States Patent and Trademark Office*